(12) United States Patent
Shoji et al.

(10) Patent No.: US 8,203,923 B2
(45) Date of Patent: Jun. 19, 2012

(54) RECORDING DEVICE AND RECORDING METHOD FOR OPTICAL RECORDING MEDIUM

(75) Inventors: Toshio Shoji, Urayasu (JP); Mitsunori Kobayashi, Chigasaki (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 12/952,977

(22) Filed: Nov. 23, 2010

(65) Prior Publication Data

US 2011/0134735 A1 Jun. 9, 2011

(30) Foreign Application Priority Data

Dec. 4, 2009 (JP) ................................. 2009-276486

(51) Int. Cl.
*G11B 7/00* (2006.01)
(52) U.S. Cl. .................................................. 369/59.11
(58) Field of Classification Search ............... 369/59.11, 369/59.12, 116, 47.5–47.53, 53.26, 53.35
See application file for complete search history.

(56) References Cited

U.S. PATENT DOCUMENTS

| | | | |
|---|---|---|---|
| 6,285,647 B1 * | 9/2001 | Van Woudenberg et al. | 369/116 |
| 6,781,936 B1 * | 8/2004 | Tieke et al. | 369/59.11 |
| 2005/0270959 A1 | 12/2005 | Iwasa et al. | |
| 2006/0044968 A1 * | 3/2006 | Narumi et al. | 369/47.5 |
| 2006/0140096 A1 * | 6/2006 | Tabata et al. | 369/59.11 |
| 2007/0159947 A1 * | 7/2007 | Matsumoto | 369/59.19 |
| 2008/0253253 A1 * | 10/2008 | Yokoi | 369/59.12 |

FOREIGN PATENT DOCUMENTS

| | | |
|---|---|---|
| JP | 05-143993 | 6/1993 |
| JP | 2006-018982 | 1/2006 |

\* cited by examiner

*Primary Examiner* — Thang Tran

(74) *Attorney, Agent, or Firm* — McDermott Will & Emery LLP

(57) ABSTRACT

It is desired that the overshooting and undershooting of optical pulse waveforms of optical pickups included in optical disk devices be reduced to improve the quality of recording. Among pulses to be recorded, the trailing edge of each last pulse and the leading edge of the subsequent erase top pulse are made to almost coincide with each other. Ratio a/b, where a is the difference between erase top pulse power level Pet and erasing power level Pe and b is the difference between recording power level Pw and the erasing power level Pe, is adjusted to realize an optical pulse waveform with reduced overshooting and undershooting for each of different recording media. Erase top pulse duration Tert is switched according to different recording speeds for different recording media.

5 Claims, 3 Drawing Sheets

RECORDING DEVICE AND RECORDING METHOD FOR OPTICAL RECORDING MEDIUM

INCORPORATION BY REFERENCE

This application relates to and claims priority from Japanese Patent Application No. 2009-276486 filed on Dec. 4, 2009, the entire disclosure of which is incorporated herein by reference.

BACKGROUND OF THE INVENTION (1) Field of the Invention

The present invention relates to a recording device and recording method for an optical recording medium. Particularly, it relates to a recording device and recording method for an optical recording medium using an improved optical pulse waveform of a laser diode (hereinafter referred to as an "LD").

(2) Description of the Related Art

In the field of recording devices (hereinafter referred to as "optical disk devices") for optical recording media including digital versatile disks (DVDs) and Blue-ray Disks (BDs), development work is underway for reducing the error rate at the time of reproduction. For that purpose, it is important to promote development work particularly for optimizing recording signal waveforms for recording information on recording media and optical pulse waveforms of LDs to which the recording signals are supplied.

In Japanese Patent Application Laid-Open No. H5 (1993)-143993, a technique is disclosed in which information bits are recorded in desired shapes at desired positions by making effects of residual heat after information recording constant.

In the technique disclosed in Japanese Patent Application Laid-Open No. 2006-18982, micro-amorphous marks are stably formed on a multi-layered phase-change information recording medium to realize satisfactory multi-level recording involving three or more levels.

SUMMARY OF THE INVENTION

The optical pulse waveforms of LDs used to record information on optical recording media are not exactly like the basic waveforms of recording signals complying with relevant standards. They, in reality, include overshoots and undershoots. Such overshoots and undershoots are undesirable, because, when recorded information is reproduced, they degrade the reproduced waveforms to cause, in the worst case, data read errors.

In many cases, the optical pulse waveform of an LD includes overshooting and undershooting even when the corresponding recording signal generated in a recording circuit is an ideal one. Such overshooting and undershooting are, in many cases, attributable to the output impedance of the LDD to drive the LD and the floating capacitance of wiring between the LD and the LDD.

It may be possible to carry out simulation using the output impedance and floating capacitance as parameters and, based on simulation results, determine a recording signal waveform with reduced overshooting and undershooting. The recording circuit may then be made to generate the recording signal waveform so as to solve the above problem. In an alternative method, overshoots and undershoots of recording signal waveforms are measured using a recording device and an optimum recording signal waveform with a reduced overshoot and undershoot is determined based on the experiment results.

The output impedance and floating capacitance, however, vary between optical pickups (OPUs) each including an LD. Therefore, in cases where the methods based on simulation or measurements made using a recording device are employed, it becomes necessary to determine, using such methods, an optimum recording signal waveform every time the type of recording device to be used is changed. This has been a problem in improving efficiency of development work.

The present invention has been made in view of the above circumstances and it is an object of the invention to provide a recording device and recording method for an optical recording medium with the device and method providing an improved optical pulse waveform.

To achieve the above object, the present invention provides a recording device for an optical recording medium which records and reproduces an information signal. The recording device comprises: a recording signal processing circuit which, by adding an error correction code for error correction at a time of reproduction, to supplied recording data, generates a recording code according to a code occurrence frequency; a write pulse generation circuit which generates a write pulse for recording, based on the recording code supplied from the recording signal processing circuit, on the optical recording medium and an erase top pulse having a leading edge approximately coinciding with a trailing edge of the write pulse; a laser diode drive (LDD) for power-amplifying the write pulse generated by the write pulse generation circuit; an optical pickup including a laser diode (LD) for recording information by irradiating the optical recording medium with a laser beam based on the write pulse supplied from the LDD; and a system control circuit for controlling each element of the recording device.

The present invention also provides a recording method for an optical recording medium for recording and reproducing an information signal. The recording method comprises the steps of: recording signal processing in which a recording code according to a code occurrence frequency is generated by adding an error correction code for error correction at a time of reproduction to supplied recording data; write pulse generation in which a write pulse for recording, based on the recording code supplied from the recording signal processing step, on the optical recording medium and an erase top pulse having a leading edge approximately coinciding with a trailing edge of the write pulse are generated; and recording in which the write pulse generated in the write pulse generation step is recorded on the optical recording medium. In the write pulse generation step, the power level of the erase top pulse is set according to the optical recording medium being used so as to approximately minimize overshooting or undershooting of the recording waveform used in the recording step.

According to the present invention, a recording device and recording method for an optical recording medium with the device and method providing an improved optical pulse waveform can be provided. The invention can thus contribute toward improving the basic performance of a recording device.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE EMBODIMENT

An embodiment of the present invention will be described below with reference to drawings.

Figure 1:
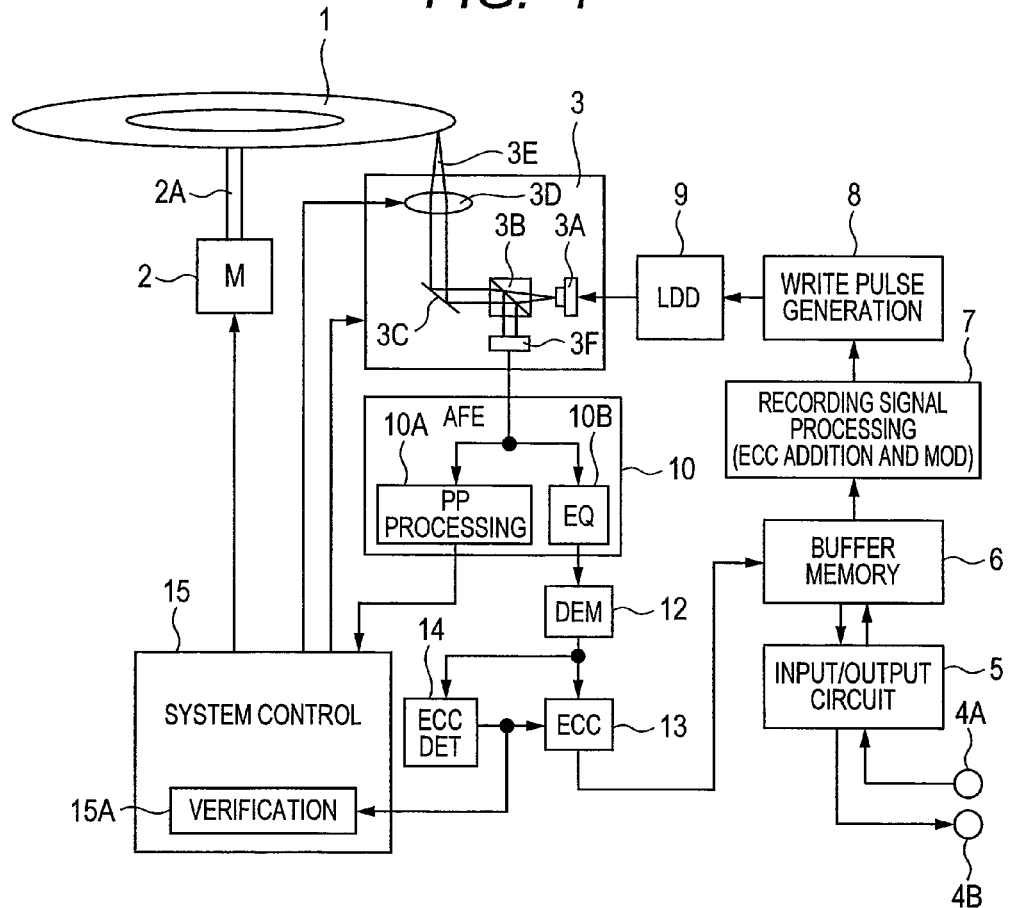
FIG. 1 is a block diagram of an optical disk device according to an embodiment of the present invention.

FIG. 1 is a block diagram of an optical disk device according to an embodiment of the present invention. The optical disk device shown in FIG. 1 records data including images and sounds on optical disk 1 and reproduces the recorded data under the control of a host device (not shown), for example, a personal computer (PC). The following description will focus on the optical disk device (driving part) directly related with the present embodiment without elaborating on the relationship between the optical disk device and the host device.

The optical disk 1 that is a recording medium may be, for example, a compact disk (CD), digital versatile disk (DVD), or Blu-ray disk (BD). It may be either a recordable optical disk such as a BD-R or DVD-R allowing recording only once or a rewritable optical disk such as a BD-RE or DVD-RAM allowing recording and rewriting.

The optical disk 1 loaded in position is rotationally driven by a spindle motor 2 via a shaft 2A. A drive control signal for driving the optical disk 1 is supplied from a system control circuit 15.

An optical pickup 3 irradiates the recording surface of the optical disk 1 with a laser beam 3E to record data on the recording surface of the optical disk 1 or reproduce recorded data. Namely, a laser beam modulated based on the coded data to be recorded is generated by a semiconductor laser source 3A, for example, a laser diode (LD). To record data on the optical disk 1, the modulated laser beam advances passing a beam splitter 3B, is reflected by a reflecting mirror 3C, is focused, by an objective lens 3D, on the recording surface of the optical disk 1, and, as the laser beam 3E, irradiates the recording surface of the optical disk 1. To reproduce recorded data, the laser beam 3E modulated according to recorded bits on the optical disk 1 and reflected by the optical disk 1 advances through the objective lens 3D to be reflected by the reflecting mirror 3C. The laser beam 3E is then reflected by the splitting plane of the beam splitter 3B and is detected, while being converted into an electrical signal, by an optical detector 3F as a reproduced signal. The construction of the optical pickup 3 shown in FIG. 1 is a simplified example. It may further includes, for example, a collimator lens for absorbing aberration, or its elements may be arranged differently than shown in FIG. 1.

The optical pickup 3 is mounted in a thread mechanism (not shown) to be radially movable over the optical disk 1 and performs data recording and reproduction at prescribed tracks of the optical disk 1. The control signal for recording and reproduction is generated by the system control circuit 15. The objective lens 3D is mounted in an actuator (not shown) and its position is finely adjusted based on the control signal generated by the system control circuit 15 so as to allow the laser beam 3E to be correctly focused on a prescribed track on the optical disk 1.

The signal circuit section of the optical disk device will be described below. When recording data, the data to be recorded is supplied from the host device (not shown) to an input/output circuit 5 via an input terminal 4A. When the original data to be recorded is, for example, a dynamic image signal, the data supplied to the input/output circuit 6 may be compressed data of Moving Picture Experts Group (MPEG) format. The data supplied to the input/output circuit 5 is then temporarily stored in a buffer memory 6. A recording signal processing circuit 7 generates a recording signal by reading a prescribed portion of data from the buffer memory 6, adding an error correction code to the data, and modulating the data for coding based on a code occurrence probability. A write pulse generation circuit 8 receives the recording signal and converts it into a laser pulse train. A laser diode drive (LDD) 9 receives the laser pulse train and, after power-amplifying it so as to be able to drive the LD (3A) of the pickup 3, supplies it to the LD (3A). The recording signal is thus recorded on the optical disk 1.

When reproducing recorded data, a reproduced signal detected, as an electrical signal, by the optical detector 3F is supplied to an analog front end (AFE) circuit 10. The AFE circuit 10 processes the reproduced signal that is, even though digitally recorded, to be intrinsically treated as an analog signal. The AFE circuit 10 includes a push-pull signal processing circuit (PP processing) 10A and an equalizer (EQ) circuit 10B. The push-pull signal processing circuit 10A generates, by arithmetically processing the reproduced signal, a tracking error (TE) signal and a focus error (FE) signal and supplies the generated signals to the system control circuit 15. The system control circuit 15 generates, based on the TE signal and FE signal supplied, servo signals for tracking and for focusing and supplies the servo signals to the optical pickup 3 thereby controlling the operation of the optical pickup 3. Details of the methods for generating the TE signal and FE signal, not being directly related with the object of the present invention, will not be described in this specification.

In the EQ circuit 10B, the frequency characteristics of amplitudes and phases observed when data is recorded or reproduced using the optical pickup 3 and optical disk 1 are equalized so that the reproduced signal waveform is as close to the output waveform of the LDD 9 as possible. Furthermore, in a demodulator (DEM) circuit 12, the reproduced signal is demodulated, thereby removing the modulation to which the recording signal was subjected for coding in the recording signal processing circuit 7. In an error correction circuit (ECC) 13, the reproduced signal undergoes error correction processing to correct errors generated during recording and reproducing processes. The error correction processing is performed when, in an ECCDET (detector) circuit 14, an error is detected based on the error correction code added to the recording signal in the recording signal processing circuit 7. The reproduced signal, i.e. the reproduced data having undergone required error correction in the ECC circuit 13 is temporarily stored in the buffer memory 6 to be sequentially transferred to the host device (not shown) via the input/output circuit 5 and an output terminal 4B.

The output of the ECCDET circuit 14 is also supplied to a verification circuit 15A included in the system control circuit 15. In the verification circuit 15A, it is determined whether once-recorded data is of quality good enough to be processed for error correction in the ECC circuit 13 to be performed when the once-recorded data is reproduced. In many cases, such verification is performed at least when recorded data is reproduced for the first time. The verification can be performed in different ways. In the present embodiment, data is verified based on the frequency of error detection in the ECCDET circuit 14.

Figure 2:
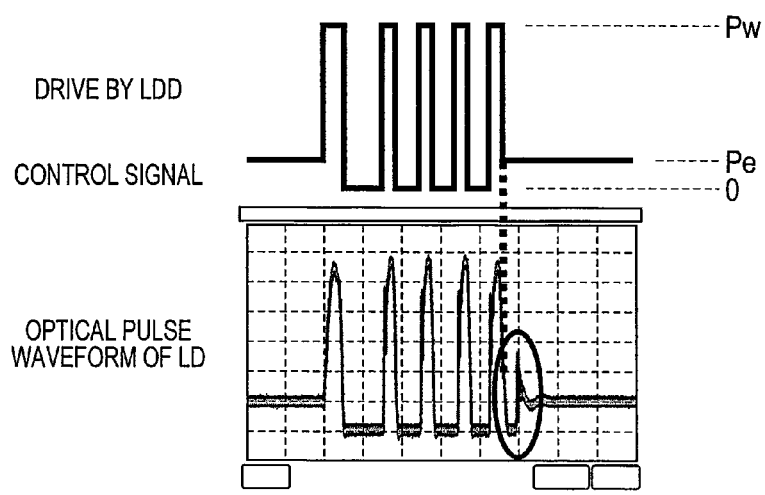
FIG. 2 is a waveform diagram showing an example drive control signal generated by an LDD and an example optical pulse waveform generated by an LD.

With reference to FIG. 2, overshooting and undershooting of an optical pulse waveform of an LD will be described below. FIG. 2 is a waveform diagram showing an example drive control signal generated by an LDD and an example optical pulse waveform generated by an LD. The optical pulse waveform shown in FIG. 2 is a waveform of a 6T pulse. The drive control signal is an output signal of the LDD 9 shown in FIG. 1 originated from a recording signal generated by the light pulse generation circuit 8. In FIG. 2, "Pw" denotes a recording power level, "Pe" denotes an erasing power level, and "0" denotes a zero power level (no emission). Also, the optical pulse waveform of the LD shown in FIG. 2 is the waveform of the laser beam 3E shown in FIG. 1.

As is known from FIG. 2, even with the drive control signal generated by the LDD having a rectangular waveform, the optical pulse waveform of the LD has an overshoot and an undershoot in the portion circled in FIG. 2. When the last pulse returns from the Pw level to the Pe level, undershooting reaching the 0 level past the Pe level occurs. When the last pulse returns from the 0 level to the Pe level, overshooting occurs. Such overshooting and undershooting result in errors between the recording waveform and the reproduced waveform to cause, in the worst case, a read error.

The "T" in the "6T pulse" mentioned above represents the period of the basic clock signal for operation. The recording signals used for DVDs range from 3T pulses to 14T pulses. The recording signal processing circuit 7 operates to use shorter pulses, for example, 3T pulses, for more frequently occurring codes.

Figure 3A:
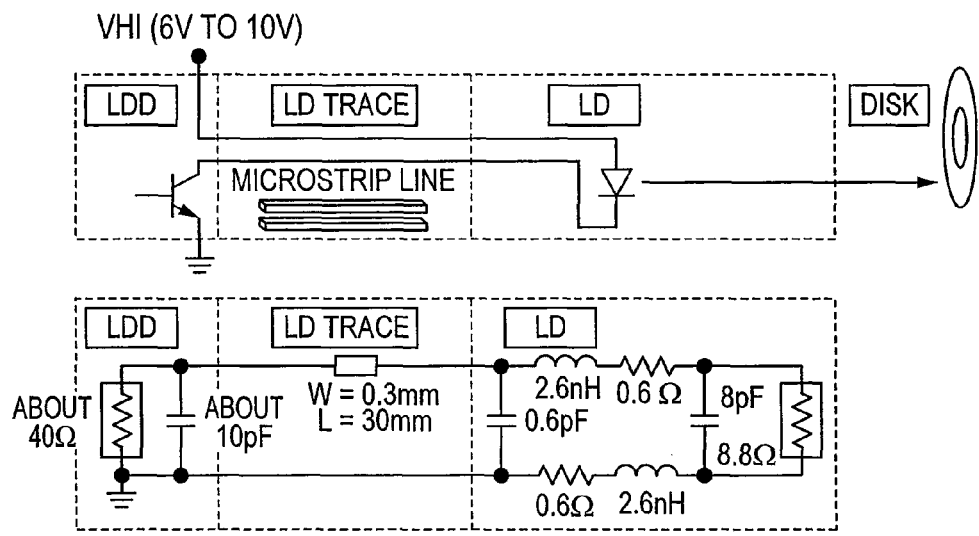
FIG. 3A shows a circuit diagram of a portion around an LDD and LD and an equivalent circuit representation.
Figure 3B:
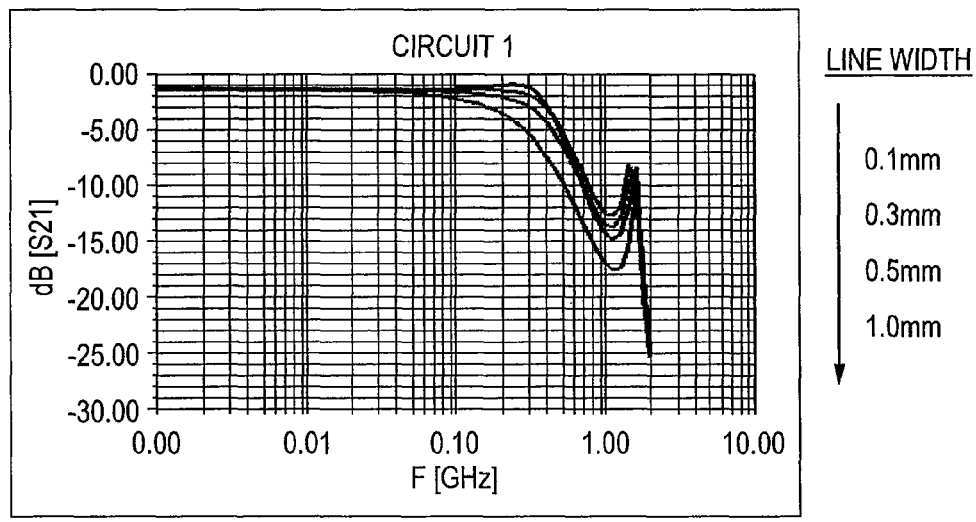
FIG. 3B is a frequency characteristic chart showing example characteristics of transmission from the LDD to the LD.

Next, with reference to FIGS. 3A and 3B, the causes of overshooting and undershooting of an optical pulse waveform will be described below. FIG. 3A shows a circuit diagram of a portion around an LDD and LD included in an optical disk device and an equivalent circuit representation. FIG. 3B is a frequency characteristic chart showing example characteristics of transmission from the LDD to the LD.

Referring to FIG. 3A, the final stage of the LDD includes, for example, a grounded emitter (collector follower) circuit. Between the collector of the transistor in the final stage and a bias supply VHI (for example, about 6 to 10 V), the LD is connected as a load via a microstrip line. Information is recorded on a recording medium according to the emission of the LD. The LDD has an output impedance provided, for example, by a 40-ohm resistor and a 10-pF capacitor connected in parallel. The length (L) of the microstrip line is, for example, about 30 mm though dependent on device condition. In many cases, the microstrip line has a width (W) of about 0.3 mm. As in FIG. 3A, the LD is represented, for example, by resistors, coils, and capacitors ranging from the left 0.6 pF capacitor to the right 8.8 ohm resistor.

In FIG. 3B, example frequency characteristics of transmission from an LDD to an LD are shown for four different microstrip line widths including 0.3 mm. Namely, FIG. 3B shows frequency characteristics of low-frequency pass filters (LPFs) with a cutoff frequency of several hundred MHz (−3 dB) which are high-order frequency characteristics with peaks in an out-of-band 1-to-2 GHz range. These frequency characteristics cause overshooting or undershooting of the waveform of an electric current flowing through an LD. Hence, in the optical pulse waveform of the LD, too, overshooting or undershooting occurs, as shown in FIG. 2, in a transient period following a sharp change in waveform.

How to reduce the waveform overshooting or undershooting described above will be described below. The pulse waveform of an LDD drive control signal shown in FIG. 2 is an original 6T-pulse waveform. In reality, however, the waveform reaches the erasing power level Pe, in many cases, via a zero power period following the last pulse and another pulse called an erase top pulse. The erase top pulse is provided to precede the erasing power period so as not to delay the time when erasing is actually started.

In the present embodiment, the leading edge of the erase top pulse is made to almost coincide with the trailing edge of the last pulse so as to reduce the no-emission period unintentionally generated by undershooting occurring immediately after the last pulse and also reduce the subsequent overshooting.

The present embodiment will be described below comparing FIG. 4A and FIG. 4B.

Figure 4A:
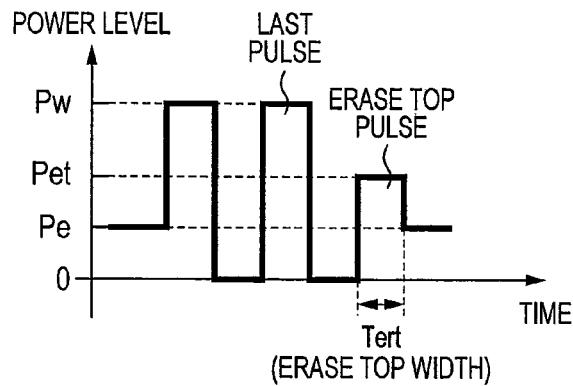
FIG. 4A is a waveform diagram of general recording pulses.

FIG. 4A is a waveform diagram of general recording pulses. FIG. 4B is a waveform diagram of recording pulses according to the present embodiment. Unlike the 6T pulse waveform shown in FIG. 2, the waveforms shown in FIGS. 4A and 4B are 4T pulse waveforms.

Generally, as shown in FIG. 4A, a recording pulse waveform includes an erase top pulse which is generated by power of level Pet between the recording power level Pw and the erasing power level Pe. The erase top pulse lasts, after a predetermined amount of time elapses from the last pulse, as long as a period Tert. Namely, when the power level during the period Tert is Pe, as shown in broken line in FIG. 4A, there is no erase top pulse provided. When the power level during the period Tert is Pet, as shown in solid line in FIG. 4A, there is an erase top pulse provided. The period Tert is, as mentioned above, set to an optimum value not to delay the rising of the erasing power.

Figure 4B:
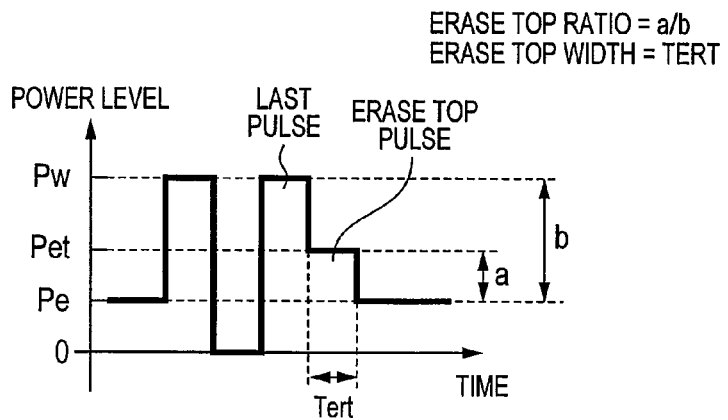
FIG. 4B is a waveform diagram of recording pulses according to the embodiment of the invention.

In the present embodiment, as shown in FIG. 4B, the leading edge of the erase top pulse is made to almost coincide with the trailing edge of the last pulse so as to reduce the overshooting and undershooting described above.

Another characteristic of the present embodiment is that the power level Pet of the erase top pulse is set to an optimum value using ratio a/b as a parameter where "a" is the difference between Pet and Pe and "b" is the difference between Pw and Pe as shown in FIG. 4B. The optimum power level for reducing overshooting and undershooting differs between recording media such as BD-REs and DVD-Rs. Such an optimum value can be determined by prior experiments, and there are not many factors to make the optimum value vary between optical disk devices. Therefore, an arrangement may be made such that, upon determining the type of the recording medium to be used, the system control circuit 15 specifies, for application by the write pulse generation circuit 8, an optimum value of a/b for the recording medium. When differences in optimum a/b value between different recording media are small, a constant value of a/b may be applied for the different recording media.

Figure 5:
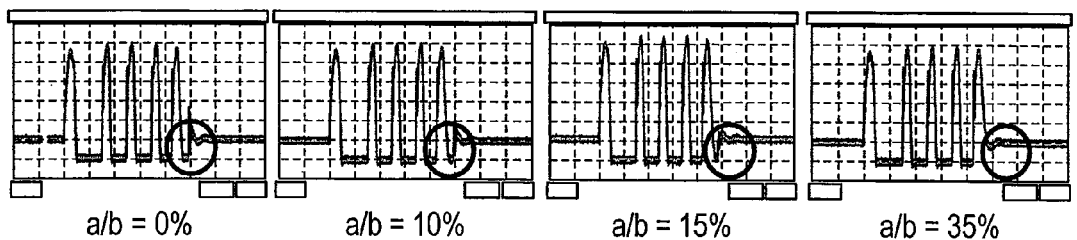
FIG. 5 shows optical pulse waveforms of an LD according to the embodiment of the invention.

With reference to FIG. 5, changes in overshooting and undershooting observed by experiments made with different values of a/b will be described below. FIG. 5 shows optical pulse waveforms of an LD according to the present embodiment. The waveforms shown in FIG. 5 have been obtained using DVD-RWs as recording media, but similar results have also been obtained using BD-REs.

Referring to FIG. 5, the waveform observed with (a/b=0%), i.e. with no erase top pulse provided, shows an overshoot and an undershoot similar to those shown in FIG. 2. With larger values of a/b, i.e. 10% and 15%, the overshoots observed before the pulse power becomes 0 are smaller and, when the a/b value is increased to 35%, the overshoot is small enough to cause almost no problem. The value of a/b cannot be increased to be close to 100%, as doing so will result in having an undesired mark to be recorded, but the value of (a/b=35%) is low enough to cause no undesired mark to be recorded. Setting the value of a/b to 35% does not result in delaying the subsequent rising of the erasing power, either, so that the effect of the erase top pulse and the intended effect of the present embodiment can be both realized. Furthermore, according to the present embodiment, an optimum value of a/b can be determined by experiments using the ratio a/b as a parameter. This improves efficiency in developing a new model of optical disk device compared with conventional cases where recording signal waveforms obtained by simulation or experiments made without using such a parameter are applied.

Still another characteristic of the present invention is that, unlike in conventional cases, the period (duration) Tert of the erase top pulse, shown in FIG. 4B, can be varied for application to different types of recording media.

As is well known, CDs, DVDs, and BDs allow high-speed recording in which data over a unit amount of time is recorded several times as fast. Generally, recordable media allow faster recording than rewritable media. Referring to the optical pulse waveform shown in FIG. 2, the duration of overshooting or undershooting is constant, for example, about 3 ns regardless of the recording speed involved.

In the case of DVDs, the basic operation clock frequency is 26.16 MHz for recording at normal speed, so that the period T is 38.2 ns. The overshooting or undershooting duration of 3 ns is, therefore, equivalent to a period of $(5/64)$ times T. It is therefore possible to optimally change the erase top pulse duration Tert, shown in FIG. 4B, according to the recording speed, namely, by selectively setting Tert to $(5/64)$T for normal speed recording, $(5/32)$T for double speed recording, and $(5/16)$T for quadruple speed recording. This approach can also be used for recording at different speeds using different types of recording media. For such recording, the value of Tert can be changed by having the system control circuit 15 specify a Tert value for application by the write pulse generation circuit 8.

The above embodiment has been described by way of example only and not in any limitative sense. For example, concrete constructions of portions of the optical pickup 3 and LDD 9 have been described, but they do not constitute limiting conditions for the present invention. Even though different embodiments are possible based on the spirit of the invention, they remain within the scope of the invention.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A recording device for an optical recording medium which records and reproduces an information signal, the recording device comprising:

a recording signal processing circuit which, by adding an error correction code for error correction at a time of reproduction, to supplied recording data, generates a recording code according to a code occurrence frequency;

a write pulse generation circuit which generates a write pulse for recording, based on the recording code supplied from the recording signal processing circuit, on the optical recording medium and an erase top pulse having a leading edge coinciding with a trailing edge of the write pulse;

a laser diode drive (LDD) for power-amplifying the write pulse and the erase top pulse generated by the write pulse generation circuit;

an optical pickup including a laser diode (LD) for recording information by irradiating the optical recording medium with a laser beam based on the write pulse and the erase top pulse supplied from the LDD; and a system control circuit for controlling each element of the recording device.

2. The recording device for an optical recording medium according to claim 1, wherein the system control circuit controls the power level of the erase top pulse generated by the write pulse generation circuit according to the optical recording medium being used so as to minimize overshooting or undershooting of the optical pulse waveform of the laser beam emitted from the optical pickup.

3. The recording device for an optical recording medium according to claim 1, wherein the system control circuit controls the duration of the erase top pulse generated by the write pulse generation circuit according the speed of recording on the optical recording medium.

4. A recording method for an optical recording medium for recording and reproducing an information signal, the recording method comprising the steps of:

recording signal processing in which a recording code according to a code occurrence frequency is generated by adding an error correction code for error correction at a time of reproduction to supplied recording data;

write pulse generation in which a write pulse for recording, based on the recording code supplied from the recording signal processing step, on the optical recording medium and an erase top pulse having a leading edge coinciding with a trailing edge of the write pulse are generated; and recording in which the write pulse generated in the write pulse generation step is recorded on the optical recording medium;

wherein, in the write pulse generation step, the power level of the erase top pulse is set according to the optical recording medium being used so as to minimize overshooting or undershooting of the recording waveform used in the recording step.

5. The recording method for an optical recording medium according to claim 4, wherein, in the write pulse generation step, the duration of the erase top pulse is set according the speed of recording on the optical recording medium.

* * * * *